US008829869B2

(12) United States Patent
Kooken et al.

(10) Patent No.: US 8,829,869 B2
(45) Date of Patent: Sep. 9, 2014

(54) DYNAMIC POWER FACTOR CORRECTION AND DYNAMIC CONTROL FOR CONVERTER IN POWER SUPPLY

(75) Inventors: Todd Kooken, Solon, OH (US); Matthew Jon Krueger, Medina, OH (US); Lifeng Luo, Solon, OH (US)

(73) Assignee: Lincoln Global, Inc., City of Industry, CA (US)

( * ) Notice: Subject to any disclaimer, the term of this patent is extended or adjusted under 35 U.S.C. 154(b) by 311 days.

(21) Appl. No.: 13/291,295

(22) Filed: Nov. 8, 2011

(65) Prior Publication Data
US 2013/0114306 A1 May 9, 2013

(51) Int. Cl.
*G05F 1/00* (2006.01)
*H02M 1/10* (2006.01)
*H02M 1/42* (2007.01)
*H02M 3/158* (2006.01)
*H02M 1/00* (2006.01)

(52) U.S. Cl.
CPC .......... *H02M 1/4225* (2013.01); *H02M 3/1584* (2013.01); *H02M 1/10* (2013.01); *Y02B 70/126* (2013.01); *H02M 2001/0022* (2013.01)
USPC ....................................................... 323/271

(58) Field of Classification Search
USPC ................... 323/207, 222, 271, 282, 285; 363/21.01, 21.09, 21.1, 21.17, 21.18, 363/37, 39–40, 44, 108, 109
See application file for complete search history.

(56) References Cited

U.S. PATENT DOCUMENTS

| 4,437,146 | A | * | 3/1984 | Carpenter | 323/222 |
| 5,594,323 | A | | 1/1997 | Herfurth et al. | |
| 2005/0269997 | A1 | | 12/2005 | Usui et al. | |
| 2006/0158912 | A1 | | 7/2006 | Wu et al. | |
| 2006/0213890 | A1 | * | 9/2006 | Kooken et al. | 219/130.21 |
| 2008/0272756 | A1 | * | 11/2008 | Melanson | 323/282 |

FOREIGN PATENT DOCUMENTS

WO 20100140051 A1 12/2010

OTHER PUBLICATIONS

Angkititrakul S. et al.,; Active Inductor Current Balancing for Interleaving Multi-Phase Buck-Boost Converter; Applied Power Electronics Conference and Exposition; (2009); pp. 537-532; XP031442729; ISBN: 978-1-4244-2811-2.
ISR and Written Opinion dated May 7, 2013.

* cited by examiner

*Primary Examiner* — Adolf Berhane
*Assistant Examiner* — Yemane Mehari
(74) *Attorney, Agent, or Firm* — Perkins Coie LLP

(57) ABSTRACT

A welding or cutting system is provided using an interleaved buck-boost stage which dynamically controls power factor correction and operation of the interleaved buck-boost modules to optimize efficiency and operation of the welding system.

20 Claims, 8 Drawing Sheets

US 8,829,869 B2

DYNAMIC POWER FACTOR CORRECTION AND DYNAMIC CONTROL FOR CONVERTER IN POWER SUPPLY

INCORPORATION BY REFERENCE

The present application is related to power supplies and their control. Topologies, structure, operation, and control of such topologies are known to those of skill in the welding and cutting art. Rather than repeating these known aspects herein, each of the U.S. patent application Ser. No. 11/551,957, filed Oct. 23, 2006; Ser. No. 11/087,179, filed on Mar. 24, 2005; Ser. No. 10/889,866, filed Jul. 13, 2004; Ser. No. 11/051,196, filed Feb. 7, 2005; Ser. No. 12/477,511, filed Jun. 3, 2009; and Ser. No. 12/477,550, filed Jun. 3, 2009 and their complete disclosures are incorporated herein by reference in their entirety.

BACKGROUND OF THE INVENTION

1. Field of the Invention

Devices, systems, and methods consistent with the invention relate to power conversion, and more specifically related to dynamic power factor correction and dynamic control converters in switch-mode power supplies, and even more specifically to welding and cutting power supplies.

2. Description of the Related Art

As welding technology and applications have advanced so have the demands on welding and cutting power supplies. These increased demands require power supplies to provide increase power density and output power capabilities. Thus, there is a drive to build power supplies to satisfy these needs. One such solution is through the use of inverter-type power supplies. These power supplies provide increased flexibility and power output. However, these types of power supplies still have operational inefficiencies.

BRIEF SUMMARY OF THE INVENTION

An exemplary embodiment of the present invention is a power supply which has an input circuit which receives an input signal having a variable voltage and outputs a fixed voltage DC bus and an output circuit which receives the fixed voltage DC bus and provides an output signal to a load. The power supply also has a controller which controls the operation of at least one switch in the input circuit to power factor correct the input signal. The controller contains a voltage compensator module which utilizes a power factor correction function having at least one power factor correction coefficient used to output a reference signal to be used for the power factor correction of the input signal. The voltage compensator module receives a reference signal representing at least one of a voltage and a frequency of the input signal and the voltage compensator module changes the power factor correction coefficient based on the reference signal.

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION OF EXEMPLARY EMBODIMENTS

Figure 1:
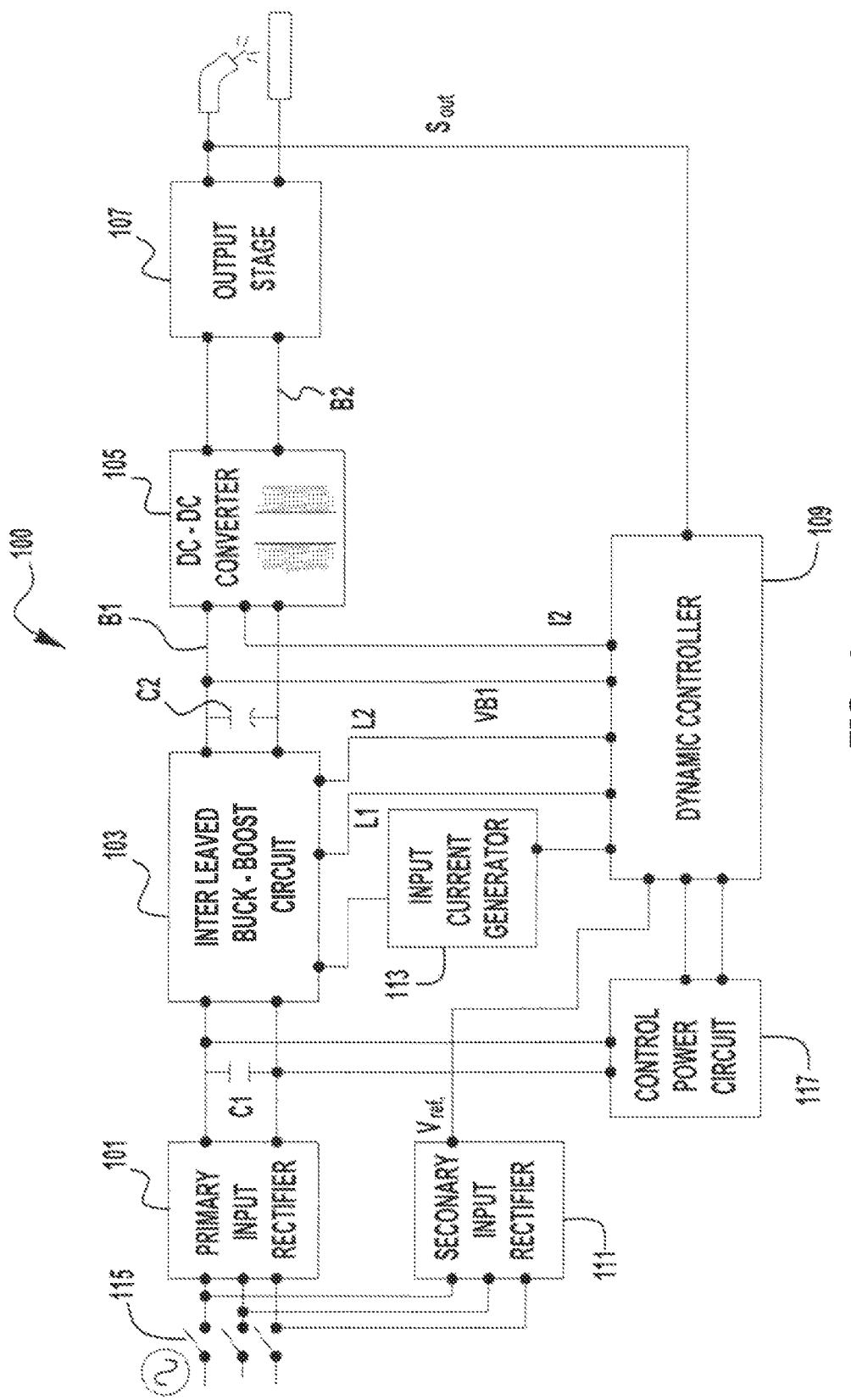
FIG. 1 illustrates a diagrammatical representation of a welding system in accordance with an exemplary embodiment of the present invention.

Exemplary embodiments of the invention will now be described below by reference to the attached Figures. The described exemplary embodiments are intended to assist the understanding of the invention, and are not intended to limit the scope of the invention in any way. Like reference numerals refer to like elements throughout.

It should be noted that the following discussions are generally referenced in the field of welding and cutting power supplies for context purposes. However, embodiments of the present invention are not limited to such types of power supplies and can be implemented in many different types of power supplies which have a dynamic load and in which optimized performance and power factor correction are desirable. Examples of such power supplies include switch mode power supplies having similar general topologies to the topology described herein, and incorporated by reference.

Turning now to the Figures of the present application, FIG. 1 depicts an exemplary welding system 100 in accordance with an embodiment of the present invention. The system 100 receives an AC signal as its input and is shown in FIG. 1 as receiving a 3-phase input. However, embodiments of the present invention are not limited to this and can receive a single phase AC input signal. The received AC input signal is directed through switches 115 and into a primary input rectifier 101. The primary input rectifier 101 rectifies the AC signal to create a rectified DC signal. The primary input rectifier 101 is of a known construction and operation and will not be described in detail herein. The primary input rectifier 101 can be either full bridge or semi-bridgeless rectifier. The AC signal can vary in voltage and frequency depending on the source of power and/or the country of operation. For example, the AC input can be from a utility grid—which can range from 100 to 660 volts at 50 or 60 Hz—or can be from a portable generator, which can also have a varying voltage and frequency. Thus, the system 100 is capable of operating properly and providing a welding or cutting signal regardless of the input AC voltage magnitude, phase type and frequency.

The rectified DC signal is directed to an interleaved buck-boost circuit 103. In some exemplary embodiments a capacitor C1 is positioned between the primary input rectifier 101 and the interleaved buck-boost circuit 103 to provide smoothing for the rectified DC signal. The interleaved buck-boost circuit 103 is capable of reducing or increasing the voltage of the rectified DC signal as needed to maintain a fixed voltage DC bus B1 at its output. Thus, the interleaved buck-boost circuit is a regulated circuit to provide a constant bus B1 voltage. In some exemplary embodiments, regardless of the input voltage of the AC signal, the DC bus B1 is fixed at a voltage of 400 VDC. However, as will be explained in more detail below, in exemplary embodiments of the present invention, the fixed voltage of the DC bus B1 can vary depending on certain operational characteristics and based on parameters of the input AC signal. Thus, in some embodiments, the DC bus B1 fixed voltage will be different based on different operational parameters to increase efficiency. It is of course understood that the voltage of the bus B1 can vary slightly during operation even though the bus B1 is a fixed DC bus having a desired fixed operational DC voltage. These minor operational fluctuations or transients are known and expected, but still represent a fixed DC bus.

It is noted that embodiments of the system 100 of the present invention are not limited to using interleaved buck-boost circuits (as shown as 103), but other types of circuits, such as buck circuits, boost circuits or buck-boost circuits can be utilized. That is, embodiments of the present invention, as described herein, can be utilized with many different types of systems which use a converter circuit which converts a rectified AC signal to a relatively fixed bus voltage, such as those stated above. Thus, the system 100 can use a boost circuit, buck circuit, or buck-boost circuit (in place of the interleaved buck-boost circuit shown), which creates a relatively fixed bus voltage and is used to implement power factor correction for the system 100, without departing from the spirit and scope of the present invention. Further, the description and structure of embodiments described herein can be implemented with such circuits by skilled artisans, consistent with the discussions herein.

In the exemplary embodiment shown in FIG. 1, the DC bus B1 can have a storage capacitor C2 which can store energy such that power flow to the DC-DC converter 105 remains uninterrupted as the load/input varies during operation. Accordingly, to the extent the capacitor C2 is present it should be sized to provide the desired energy storage.

In the system 100, downstream of the interleaved buck-boost circuit 103 is a DC-DC converter 105 which converts the DC voltage of the first DC bus B1 to a second DC voltage for a second DC bus B2. In an exemplary embodiment of the present invention, the DC-DC converter 105 comprises an inverter; high frequency transformer and rectifier to convert the DC bus B1 voltage to a second fixed bus voltage for the second DC bus B2. In an exemplary embodiment of the present invention, the DC-DC converter is an unregulated stage such that it merely uses a constant conversion ratio for the first DC bus B1 voltage to obtain the second bus B2 voltage. For example, in an exemplary embodiment the transformer can have a 4-to-1 turn ratio, which would provide a 100 VDC bus B2 if the first bus B1 voltage is at 400 VDC. In another exemplary embodiment of the present invention, the DC-DC converter 105 can be a regulated stage. A more detailed description and discussion of the construction, operation and function of this topology can be found in the applications incorporated herein by reference in their entirety. In other exemplary embodiments, this stage can also be an inverter or transformer, depending on the desired output signal from this stage.

Downstream of the second DC bus B2 is an output stage 107 which takes the signal from the second DC bus B2 and provides a desired output signal. The output signal can be in any form, such as DC or AC and can be used for either welding or cutting, as needed. As such, this output stage can be any one of an output rectifier, PWM stage, chopper, or the like, to provide the desired output signal. Embodiments of the present invention are not limited by the construction of the output stage 107. The output stage 107 can be controlled by any number of known means or methods to provide the desired welding or cutting signal and will not be described in detail herein. Further description and discussion of this stages construction and operation can be found in the applications incorporated by reference herein, in their entirety.

The system 100 also contains a dynamic controller 109 which controls the operation of at least the interleaved buck-boost circuit 103. A more detailed discussion of the dynamic controller 109 will be set forth below.

As shown in FIG. 1, in some exemplary embodiments of the present invention the dynamic controller 109 receives an input voltage signal from a secondary input rectifier 111. The secondary input rectifier 111 receives the AC input signal and rectifies it (similar to rectifier 101) and provides a signal $V_{ref}$ to the dynamic controller 109. The control power circuit 117 receives a signal from the rectified AC signal, downstream of the rectifier 101 and provides control power to the dynamic controller 109. In some embodiments, the control power circuit 117 can be configured to provide a number of different separate control voltages as may be required to turn on the controller 109, and any other control electronics within the system 100 that will need initial power. For example, the controller 109 may require a plurality of control power levels (e.g., ranging between 2 to 15 volts) to begin the operation of its various modules, all of which can be provided by the control power circuit 117. In the embodiment shown, the secondary input rectifier 111 receives the AC input signal upstream of the primary input rectifier 101 so that the signal $V_{ref}$ to the controller 109 is not distorted by the capacitor C1 and/or the circuit 103. Of course, because the system 100 is capable of operating over a wide range of input signals (e.g., 100 to 660 volts, single and three phase, and 50 to 60 Hz), the control power circuit should also be configured to operate over these same input condition ranges as the system 100. Furthermore, in other exemplary embodiments of the present invention, the control power circuit can draw its control power from other points in the system 100. For example, in some exemplary embodiments the control power can come from the AC signal upstream of the primary input rectifier 101, the first DC bus B1, or the second DC bus B2 without departing from the spirit or scope of the present invention. Implementation of such control power circuits is generally known.

As shown in FIG. 1, the dynamic controller 109 receives its reference signal from upstream of the primary rectifier 101. However, other embodiments of the present invention can receive its reference signal from other sources, without departing from the spirit and scope of the present invention. For example, the reference signal for the controller 109 can also come from the rectified signal downstream of the rectifier 101. Such configurations are generally known and need not be discussed in detail herein. Of course, because the system 100 is capable of operating over wide range of input voltages (e.g., 100 to 660 volts), with either a single or three phase AC signal, and over a range of AC signal frequencies (e.g., 50 to 60 Hz), the control power circuitry must also be capable of delivering control power to the controller 109 over the same ranges. Such technology is generally known and need not be described in detail herein.

Also provided to the dynamic controller 109 is an input reference voltage $V_{ref}$ which is the input voltage to the interleaved buck-boost circuit 103. In the embodiment shown the input reference voltage $V_{ref}$ is taken from the rectified DC signal from the secondary input rectifier 111. By providing the signal from this point the signal $V_{ref}$ is not affected or altered by the interleaved buck-boost circuit 103. The dynamic controller 109 also receives at least one current feedback signal from the interleaved buck boost circuit 103. In an exemplary embodiment of the present invention, the current feedback signal is proportional to input current. In the exemplary embodiment shown, the current feedback signal is provided to the dynamic controller 109 from an input current generator 113. In an exemplary embodiment, the input current generator 113 accepts a signal from a current transducer or current sensor and outputs a synthesized and integrated signal representing the input current to the interleaved buck-boost circuit 103. The operation and construction of an exemplary embodiment of the input current generator 113 is set forth in U.S. patent application Ser. Nos. 12/477,550 and 12/477,511, both filed on Jun. 3, 2009, both of which are incorporated herein by reference in their entirety. As such, the detailed operation and construction of the input current generator will not be discussed in detail herein.

Because the interleaved buck-boost circuit 103 is regulated by the dynamic controller 109 it has at least two leads L1 and L2 which are connected to the interleaved buck-boost circuit 103 to control the operation of the buck-boost switches, which will be described in more detail below.

The dynamic controller 109 receives a first DC bus reference voltage signal VB1 so that the dynamic controller 109 can ensure that the first DC bus B1 is being regulated to the desired fixed voltage level by the interleaved buck-boost circuit 103. Thus, the first DC bus reference voltage signal VB1 is used as feedback to ensure that the first DC bus B1 is maintained at the desired fixed bus level.

Further, in some exemplary embodiments the dynamic controller 109 receives an output reference signal $S_{out}$ downstream of the output stage 107. The output reference signal $S_{out}$ represents the output load or current of the welding or cutting power supply to provide feedback regarding the output of the system 100 to the controller 109.

The dynamic controller 109 can be constructed in any number of ways and can be implemented in a number of ways without departing from the scope and spirit of the present invention. In an exemplary embodiment of the present invention the dynamic controller is a digital controller, and can be, for example, a C2000 series digital signal controller as sold by Texas Instruments. Of course, this example is not intended to be limiting as other types of controllers can be used, so long as they are capable of performing functions similar to those discussed herein.

Figure 2:
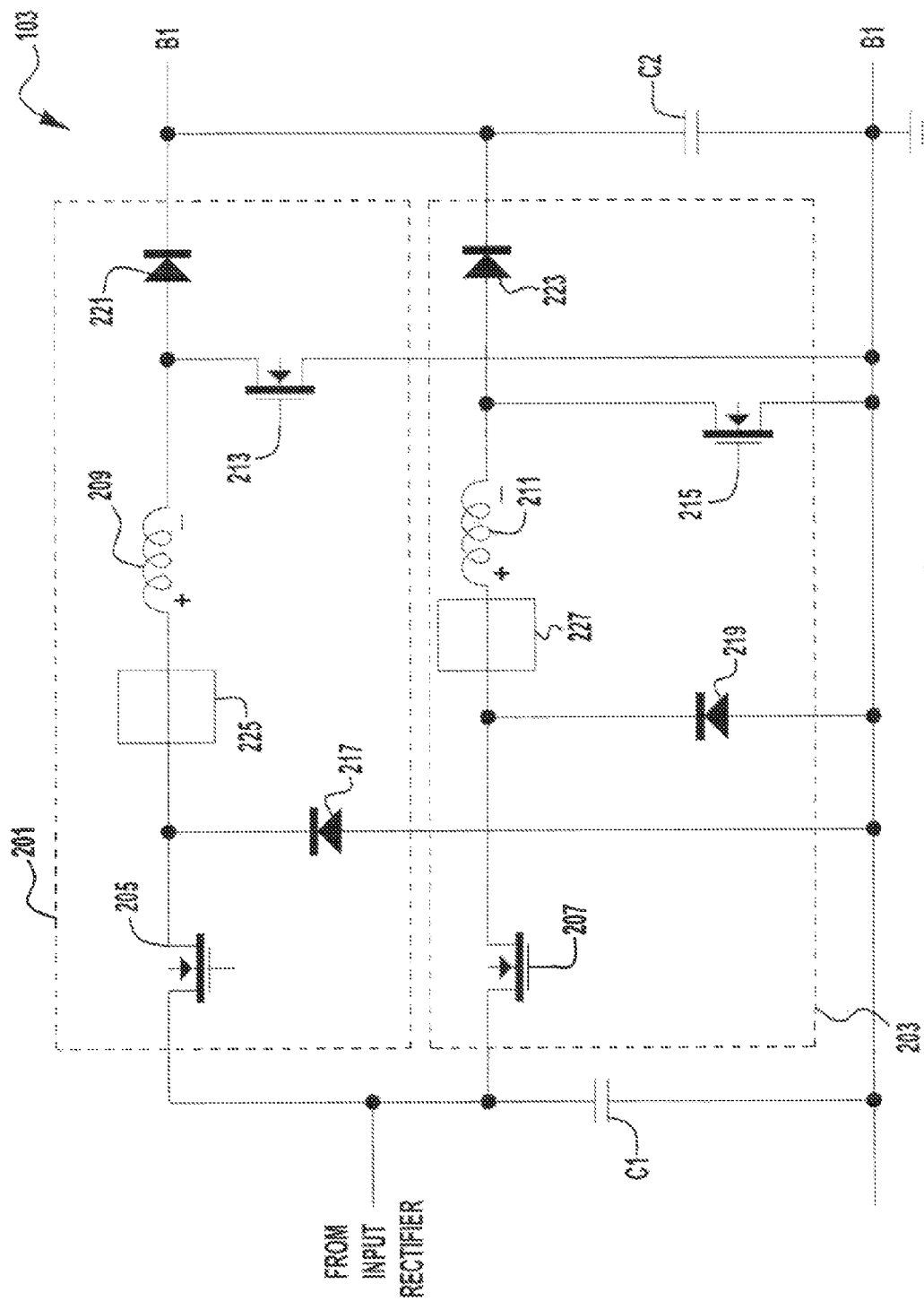
FIG. 2 illustrates a diagrammatical representation of an exemplary embodiment of an interleaved buck-boost power section in accordance with an embodiment of the present invention.

FIG. 2 is an illustrative diagram of an exemplary interleaved buck-boost circuit 103 of the present invention. The circuit 103 has at least two interleaved buck-boost modules 201 and 203. Each of the modules 201 and 203 are similarly constructed. Each of the modules 201 and 203 have, at least, buck switches 205 and 207, respectively, inductors 209 and 211, respectively, and boost switches 213 and 215, respectively. A number of diodes 217, 219, 221 and 223 are employed in the shown exemplary embodiment. Each of the modules 201 and 203 also operate similarly to either boost or buck (reduce) the incoming rectified voltage as dictate by the dynamic controller 109. Each of the switches 205, 207, 213 and 215 are connected to the dynamic controller 109 so that the dynamic controller 109 can control their operation as desired. The output of each of the modules 201 and 203 is combined to provide the first fixed DC bus B1, discussed above.

The interleaved buck-boost circuit 103 also contains at least two current transducers 225 and 227 for the respective modules 201 and 203.

Turning now to FIGS. 3A through 5, a detailed discussion of the construction and operation of the dynamic controller 109 is provided. The dynamic controller 109 is utilized to dynamically control a number of aspects of the operation of the power supply 100, including, but not limited to, power factor correction, the voltage of the first DC bus B1, and the relative share by each of the buck-boost modules 201 and 203 of the output current of the interleaved buck-boost circuit 103.

It is generally known to control either a buck or boost stage in a welding or cutting power supply such that power factor correction is achieved. Power factor is the ratio real power of the system 100 to the apparent power of the system 100. Power factor correction is the improvement of this ratio such that as much of the apparent power is utilized. Power factor correction, primarily active power factor correction, occurs by using a two loop control scheme to regulate a bus voltage (for example, DC bus B1) and to shape the input current (for example in the buck or boost stage of a power supply) in a sinusoidal fashion with minimal phase and shape distortion as possible. This improves the efficiency and reduces electrical stress of the system 100. However, to date the use of power factor correction has been greatly limited, and in fact has not optimized the operation of power supplies. This is due to the fact that power factor correction control of power supplies to date has been accomplished using control methodology which has a static or constant control function. Such a control function uses a single set of compensators for all input conditions. That is, regardless of whether or not the input is single or three-phase, regardless of the load, and regardless of the input voltage and frequency being used, a single set of compensators for performing power factor correction is used. Thus, regardless of the various parameters of a given operation the single set of compensators for the current wave shaping are used. This results in a power supply which has a power factor correction function which is not optimized for any one given set of operational parameters, but is rather a compromise for the range of operational parameters that a power supply may experience. Such a compromise limits the performance enhancements, power factor and efficiencies of these systems.

It is noted that each of FIGS. 3A through 5 are of the same controller 109 but are shown in separate figures for clarity to show the respective modules and connections within the controller 109.

Figure 3A:
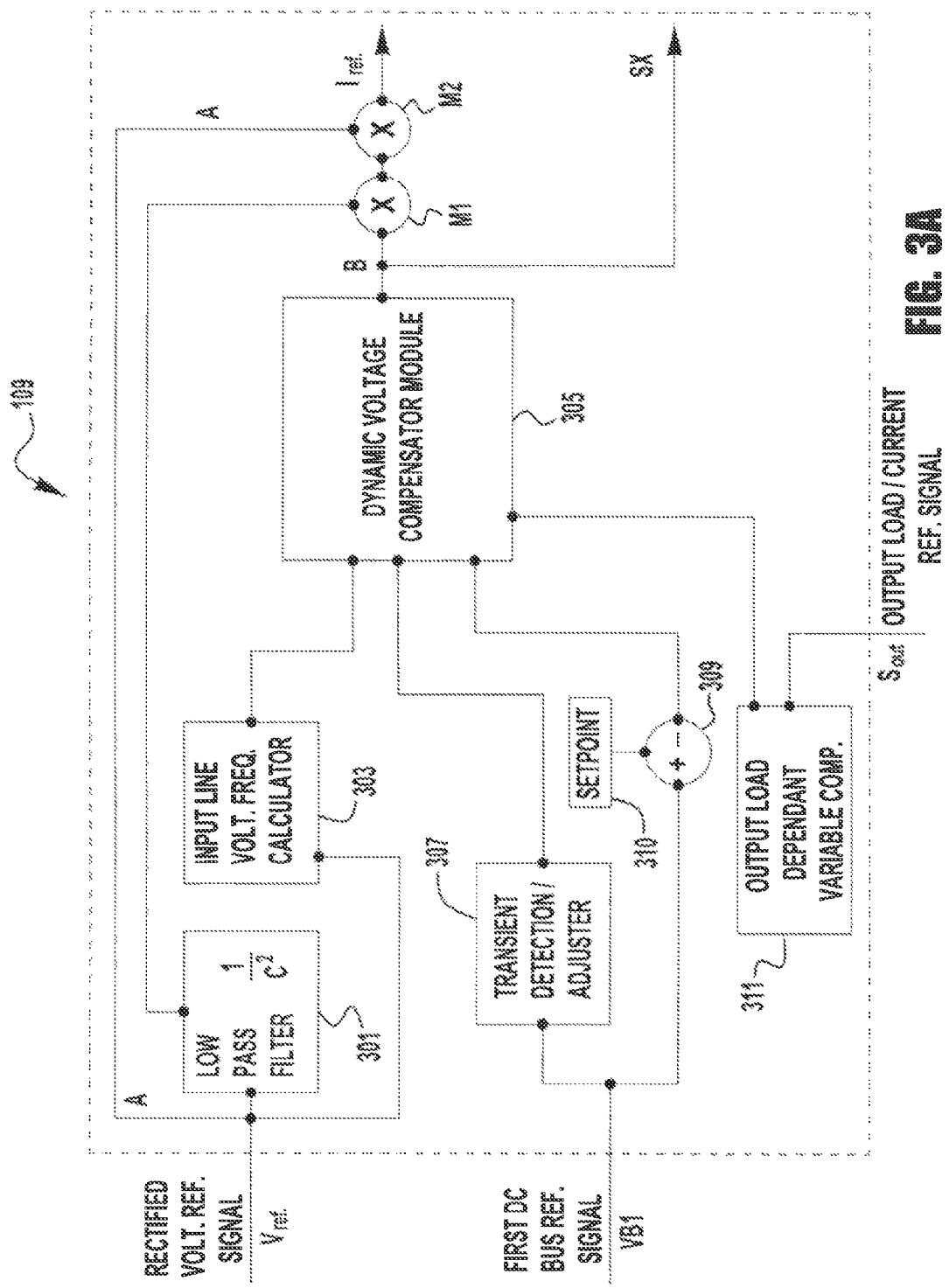
FIGS. 3A through 5 illustrate diagrammatical representations of an exemplary embodiment of a controller in accordance with an embodiment of the present invention.

FIG. 3A depicts a first portion of the controller 109 which receives the DC rectified input voltage reference signal $V_{ref}$ from the rectifier 111. This reference signal $V_{ref}$ is utilized in a number of ways to provide dynamic power factor correction. First, this reference signal $V_{ref}$ is branched off to line A to represent the desired wave shape for the interleaved buck-boost circuit 103, and is sent to a multiplier M2 to be used to create the current reference signal $I_{ref}$. Second, this input reference signal is passed through a low pass filter 301 have a value of $1/C^2$, where C is the RMS voltage of rectified signal downstream of the rectifier 111. The signal from the low pass filter 301 is sent to another multiplier M1 to be used to create the current reference signal $I_{ref}$. Additionally, $V_{ref}$ is directed to a dynamic voltage compensator module 305, the operation of which will be discussed further below. In another exemplary embodiment of the present invention (as shown in FIG. 3A), a frequency calculator module 303 is placed in line between the $V_{ref}$ signal and the dynamic voltage compensator module 305. The frequency calculator module 303 determines the frequency of the rectified signal, which can vary. As stated above, input AC signals from utilities are either 50 or 60 Hz, while input AC signals from generators or portable power supplies can vary widely. After the frequency is determined the frequency calculator module 303 sends this information to the dynamic voltage compensator module 305. The frequency information is used to enhance the dynamic response of the compensator module 305 by adjusting the coefficients used in the compensator for the different input frequencies that can be experienced by the system 100. That is, in some embodiments it may be beneficial to change the coefficients of the dynamic voltage compensator module 305 to be optimized based on the frequency of the input signal. Thus, in exemplary embodiments, predetermined coefficients can be selected for frequencies which are approximately 50 Hz and a separate set of coefficients can be selected for frequencies which are approximately 60 Hz, to optimize performance of the operation of the interleaved buck-boost circuit 103. Of course, embodiments of the present invention are not limited to just using two separate sets of coefficients (either 50 or 60 Hz), as in other embodiments a variable coefficient algorithm can be stored such that the algorithm utilizes the detected frequency to determine the appropriate set of coefficients for that detected frequency and then configure the dynamic voltage compensator module 305 with those coefficients. Then, as described above, the coefficients (and thus the compensation in the module 305) changes dynamically as changes in the input frequency are detected. Therefore, frequency transients which can occur in both utility and generator supplied signals can be dealt with in an optimal fashion because the coefficients in the module 305 will change, dynamically and in real time, with the detected transients.

The controller 109 also receives the first DC bus reference signal VB1, as shown, which is also directed to and utilized by the dynamic voltage compensator module 305. The dynamic voltage compensator module 305 utilizes its inputs to create a reference signal B to be used in the dynamic power factor correction. That is, the dynamic voltage compensator module 305 utilizes its inputs to dynamically determine a reference signal B based on its inputs. The module 305 can use either an algorithm or a look up table to evaluate and/or compare the input signals and determine an optimum reference signal B to be utilized for power factor correction. It is generally known that compensators used for power factor correction utilize compensation functions which use input data to provide an output for power factor correction. Such compensation functions use coefficients or constants which, when utilized in the compensation function, provide a desired signal. In embodiments of the present invention the dynamic control is implemented by having these coefficients variable which change dynamically based on the operational conditions of the power supply. In exemplary embodiments of the present invention the power factor correction function can either be quadratic or bi-quadratic and can utilize a plurality of coefficients (i.e., constants) which dynamically change based on detected operation conditions as described herein. In other exemplary embodiments, the compensation equation can be an equation such that it utilizes at least one dynamically changing coefficient. However, it is more desirable to utilize compensation equations utilizing a plurality of coefficients.

For example, as the first DC bus voltage drops (perhaps due to an increase in load on the system 100—when welding starts) the module 305 can modify its coefficients for the reference signal B based on that drop, while also taking into account the input voltage and/or the input voltage frequency. Taking these factors into account the module 305 outputs a desired reference signal B, which is dynamically changed as the first DC bus voltage changes, the input frequency changes and/or the input voltage changes. This allows the reference signal B (used to provide power factor correction) to be optimized for all operating conditions. Thus, unlike known systems the coefficients used in embodiments of the present invention are not constant, but rather change with the detected operational and welding conditions to optimize system performance over a broad range of conditions. In exemplary embodiment of the present invention, bi-quadratic equations using a plurality of coefficients are utilized in the compensator modules as described herein.

An advantage of the present invention is that improved transient response can be achieved. As described previously, known systems utilize a single set of coefficients, in the compensation equation, for all operating conditions experienced by such a power supply. These selected coefficients represent a compromise for the many possible conditions a system may see, as opposed to an optimization. As explained herein, embodiments of the present invention utilize dynamically changing coefficients which are optimized for various operating conditions. That is, embodiments of the present invention can better respond to transients that may occur in the DC bus B1, because an optimized selection of coefficients is determined for the experienced transient events. For example, if the DC bus B1 experiences a transient that dramatically reduces or increases the bus voltage VB1, coefficients can be utilized in the module 305 which prioritize re-stabilization of the bus voltage over power factor correction, to get the bus B1 back to desired voltage level at a faster rate because that is determined to be a more important operation based on the operational conditions. Conversely, if the transient is minimal in magnitude, coefficients can be selected which prioritize power factor correction over re-establishment of the bus voltage VB1, so that re-establishment of the bus voltage VB1 will occur at a slower rate, than if the transient is large. Thus, variable coefficients can be used to optimize system performance over a wide range of operational conditions, as opposed to a single set of coefficients representing a simple compromise.

As shown in FIG. 3A, in exemplary embodiments, the first DC bus reference signal VB1 is directed to a transient detection and adjustment module 307 (prior to the compensator module 305) which detects operational transients in the first DC bus voltage and sends a signal to the compensator module 305 to take into account temporary transients in the first DC bus B1. For example, a transient can occur do to significant events or anomalies during a welding operation. Further, in some exemplary embodiments it may be desirable change the signal to the compensator module 305 to better handle an unexpected transient in the first DC bus B1.

In a further exemplary embodiment, the first DC bus reference signal VB1 is also directed to a comparator 309 which compares the first DC bus reference signal VB1 to a bus voltage set point 310 which sets the desired bus B1 voltage level. In some embodiments, the set point 310 can be a fixed set point set by the manufacturer of the system 100 such that regardless of the operational conditions the bus voltage VB1 is to be maintained at the set level. In other exemplary embodiments, the set point can be variable and determined based on information input into the system 100 prior to its operation. For example, the system 100 can utilize various input information e.g., related to anticipated load levels, etc., and determine a desired bus voltage VB1 for the operation and set the set point 310 to that determined level.

Figure 3B:
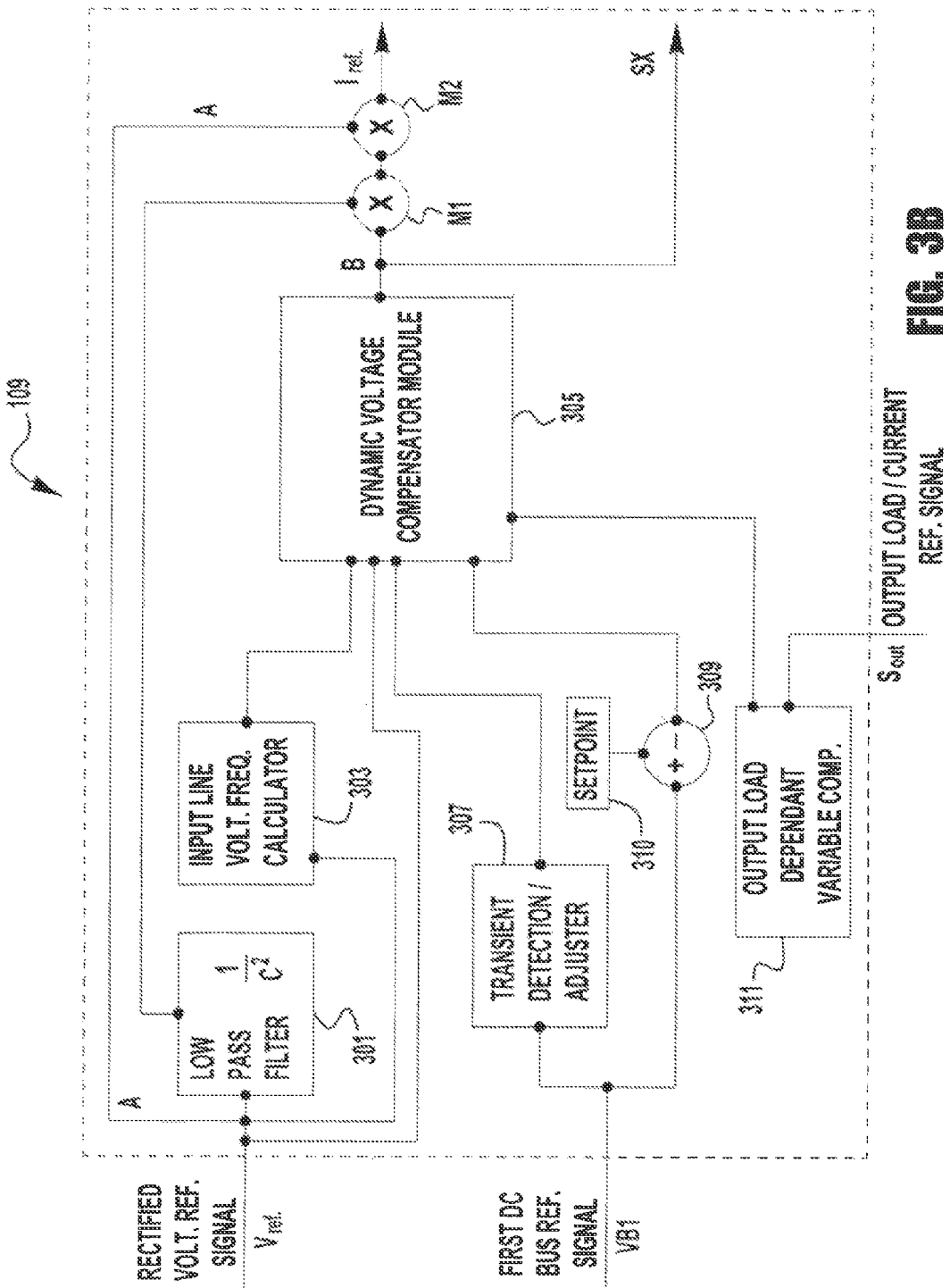

Further, as shown, in some embodiments an output reference signal $S_{out}$ (which can be any of output power, current, or voltage) is provided to a load dependant variable compensator 311. The compensator 311 receives the output reference signal $S_{out}$ taken from the output of the system 100 (e.g., see FIG. 1). From the compensator 311, a signal is sent to the dynamic voltage compensator module 305 which is also used to change the coefficients in the module to provide a desired reference signal B. That is, the coefficients utilized by the compensator module 305 can also be affected by dynamic changes in the output load, including, for example, power factor correction coefficients. For example, if the demands of the system 100 are low (that is the output is low) the selected coefficients in the module 305 will be selected to optimize performance based on the reduced load FIG. 3B depicts another exemplary embodiment of the present invention, and is similar to that shown in FIG. 3A.

However, in this exemplary embodiment $V_{ref}$ is also provided directly to the dynamic voltage compensator module 305 and is used by the module 305 to modify the coefficients based on the detected voltage $V_{ref}$. In exemplary embodiments the signal $V_{ref}$ is the RMS voltage of the input signal. Again, as stated above, the coefficients of the module 305 are modified based on the voltage $V_{ref}$ so an optimized signal B is output for the detected voltage $V_{ref}$.

Thus, in exemplary embodiments the dynamic voltage compensator module 305 uses dynamically changing compensation coefficients and outputs a reference signal B which optimizes power factor correction and the first DC bus voltage level based on the changing coefficients. The compensation coefficients in the module can be dynamical changed based on at least the input signal voltage $V_{ref}$, the input signal frequency, the first DC bus voltage, first DC bus voltage transients, and/or the output load of the system 100. Of course, not all embodiments of the present invention need incorporate dynamically changing coefficients based on all of these factors, as various combinations of information can be utilized to determine the dynamically changing coefficients.

Although not shown in FIGS. 3A/3B, in some exemplary embodiments a signal filter can be used to filter the first DC bus reference signal VB1. For example, an infinite impulse response filter can be utilized having a sample rate of 25 kHz and a frequency cut off of 1.25 kHz.

As shown in FIGS. 3A/3B, the signals A, B, and from the low pass filter 301 ($1/C^2$) are multiplied to create the current reference signal $I_{ref}$ used for dynamic power factor correction as explained below. The $I_{ref}$ signal, which is the current reference signal to be used for power factor correction, is equal to $(A \times B)/C^2$. Additionally, in some embodiments a second signal SX is branched off from the reference signal B, and its utilization is discussed further below.

Figure 4:
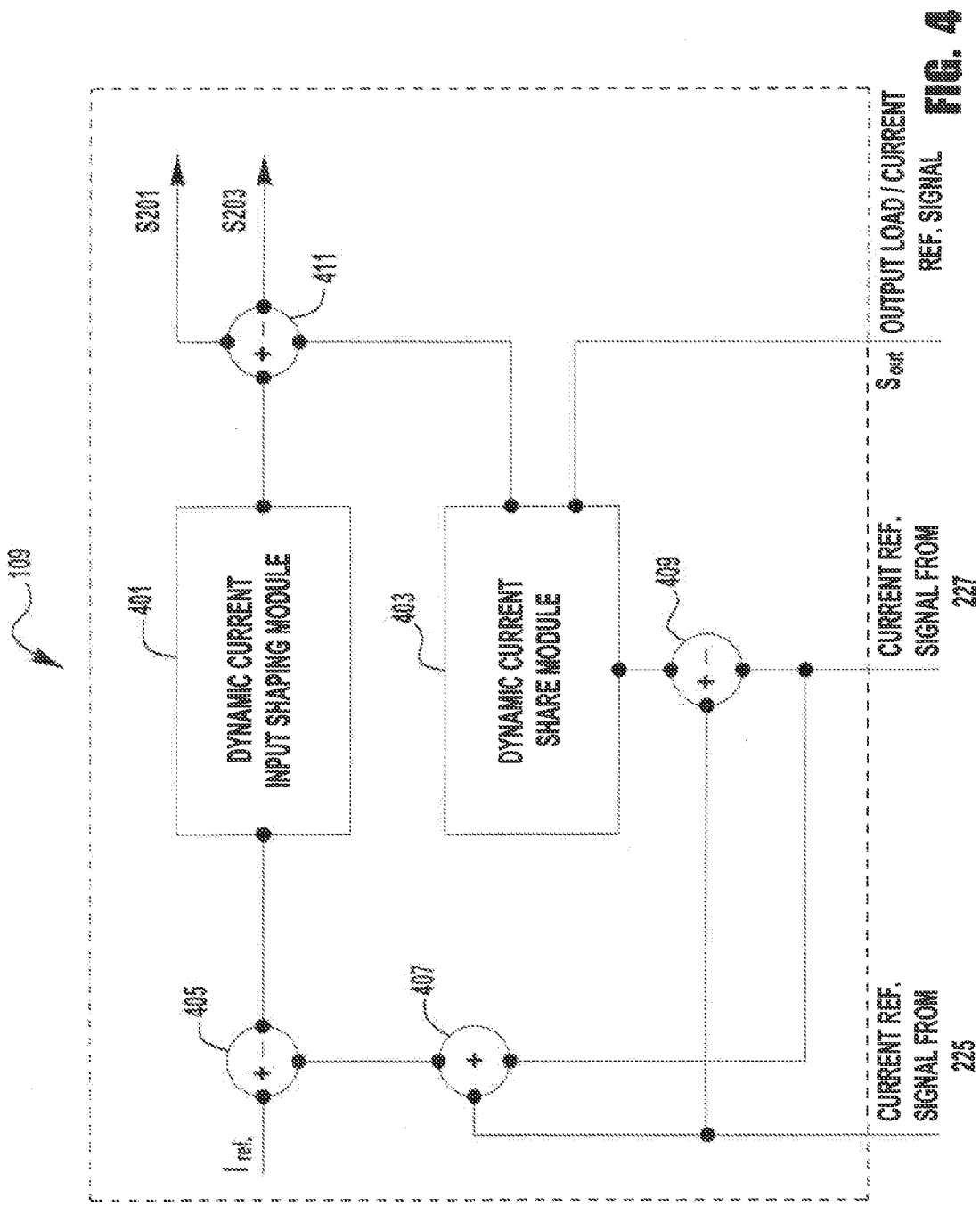

FIG. 4 shows a further portion of the controller 109. As shown, the current reference signal $I_{ref}$ is directed to a comparator 405 which compares the reference signal $I_{ref}$ with the sum of the currents from each of the respective current transducers 225 and 227. Based on this comparison an error signal is directed to a current input shaping module 401. The module 401 uses this error signal to determine and provide a power factor correction signal to be sent to the switches 205, 207, 213 and 215 in the interleaved buck boost circuit 103 to provide optimal power factor correction for each of the modules 201 and 203, respectively. In some exemplary embodiments, the compensation coefficients in the module 401 can be static or fixed.

However, in other exemplary embodiments the module 401 is a dynamic module where the compensation coefficients of the module 401 can be dynamically changed and optimized similar to that described above regarding the module 305. That is, the module 401 can either utilize algorithms, state tables, or look up tables which dynamically control the power factor correction coefficients based on the various feedback information provided to the controller 109. Thus, unlike other systems the coefficients used by the modules 305 and 401, to perform power factor correction, dynamically change based on the feedback information discussed herein. Therefore, rather than having steady state coefficients or a compensation function, the coefficients in embodiments of the present invention change based on the operational state of the system 100, and the operation being performed. This allows the controller 109 and system 100 to perform optimally in many different conditions, as opposed to none.

As shown in FIG. 4, in embodiments with an interleaved circuit 103 configuration, the current reference signals from each of the current transducers 225 and 227 are provided to the controller 109. As stated above these signals are summed at 407 to be compared with $I_{ref}$ for the module 401. However, in further exemplary embodiments of the present invention, these current reference signals are also compared with each other at 409 to ensure that each of the modules 201 and 203 of the interleaved buck-boost circuit 103 are equally sharing the current load during operation. That is, during operation it is possible that operational and/or circuit anomalies may cause the modules 201 and 203 to carry varying amounts of the total current to the first DC bus B1. For example, the module 201 may carry 52% while the other module carries 48%. Such operation may be undesirable and this embodiment of the present invention identifies a difference in current load between the modules 201/203 and, to the extent a difference exists, the module 403 sends a current share signal to a combiner 411 which combines this current share signal with the current shaping signal from the module 401. The resultant combined signal is then divided into two control signals S201 and S203 for each of the respective modules, which will be further discussed with respect to FIG. 5.

In another exemplary embodiment of the present invention, it may not be desirable to have both buck-boost modules 201 and 203 operating. For example, if the output load on the system 100 is small as compared to the system's maximum output level it may not be efficient to share the reduced output load between the modules 201 and 203 and thus only one module 201 or 203 need be operated to provide the load. This can occur when the system 100 is in either asleep or in idle mode. Further, it may be more efficient to operate only one module 201 or 203 for the load demand. In such an embodiment, the dynamic current share module 403 also receives the output reference signal $S_{out}$. It is noted that this can be branched off from the output reference signal $S_{out}$ shown in FIG. 3. The dynamic current share module 403 receives this output reference signal and determines that it is desirable for the output current of the circuit 103 to be provided by only one buck-boost module 201 or 203. This determination is then reflected in the signal to the combiner 411. As such, only one of the buck-boost modules will operate to provide the current load demand. Then, as the load increases over a predetermined threshold, the dynamic current share module 403 causes the other of the buck-boost modules 201 or 203 to be operated so that the output current is now shared equally.

Figure 5:
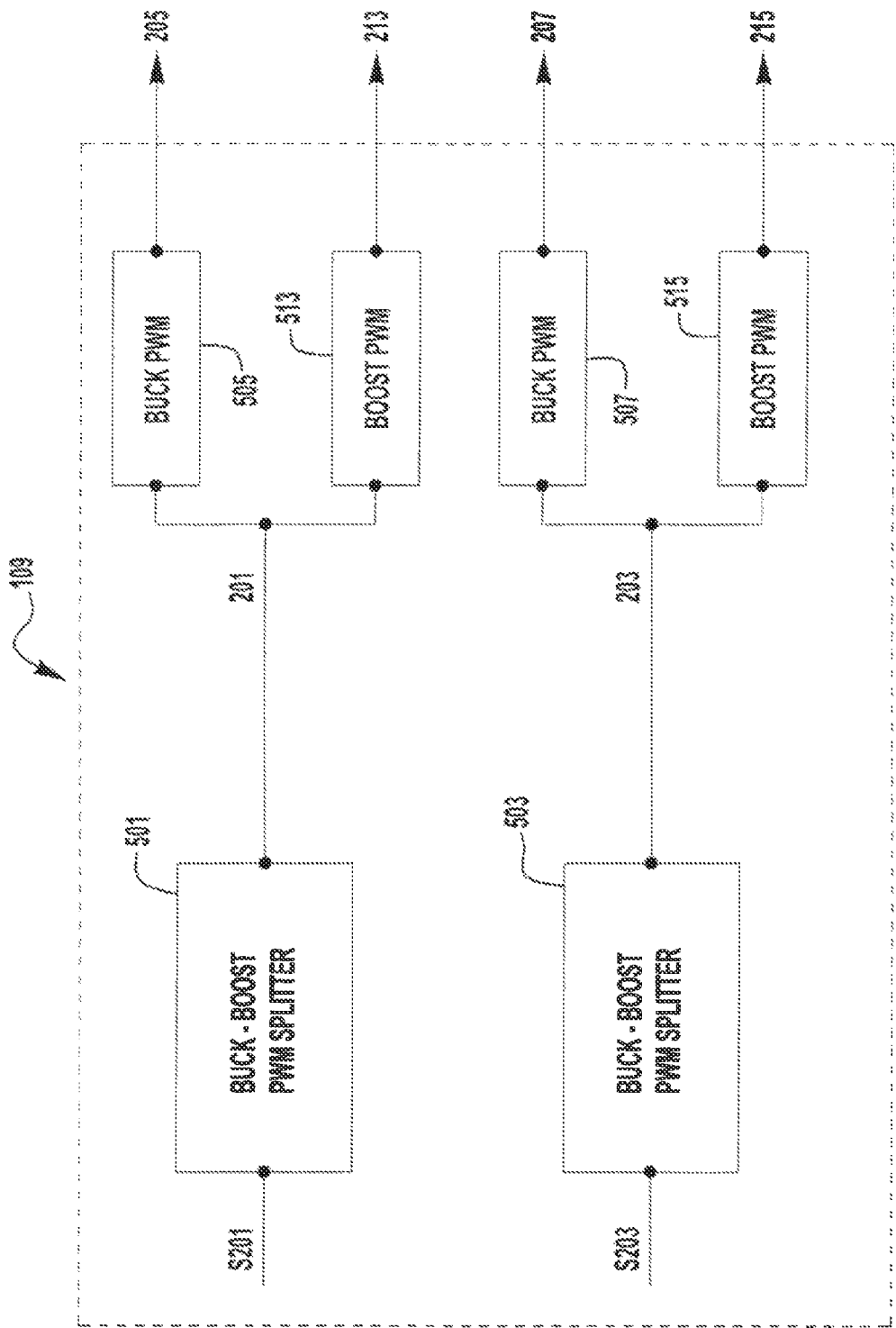

Turning now to FIG. 5, another portion of the controller 109 is shown. As shown, each of the signals S201 and S203 are directed to respective buck-boost PWM splitters 501 and 503 to direct signals to PWMs to control the switches in the interleaved buck-boost circuit 103. As shown, the PWM splitter 501 is for the module 201 and sends a signal to the buck PWM 505 (connected to the buck switch 205) and to the boost PWM 513 (connected to the boost switch 213). Similarly, the PWM splitter 503 is for the module 203 and sends a signal to the buck PWM 507 (connected to the buck switch 507) and to the boost PWM 515 (connected to the switch 215). Thus, the switches 205, 207, 213 and 215 are controlled as needed to effect the dynamically controlled power factor correction, current sharing and DC bus B1 voltage as needed to optimize the operation of the system 100.

Figure 6:
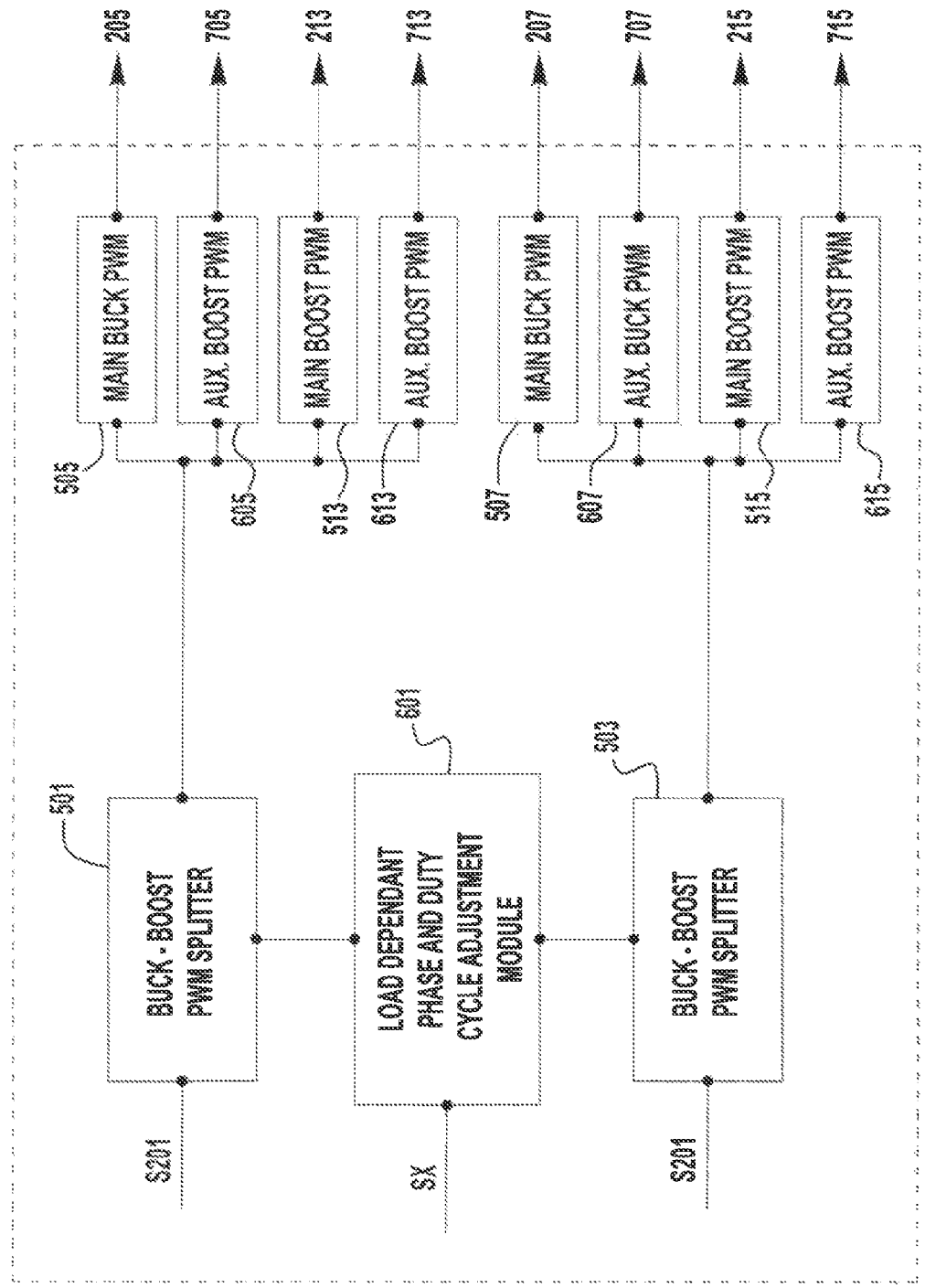
FIGS. 6 and 7 illustrate diagrammatical representations of another exemplary embodiment of the present invention.
Figure 7:
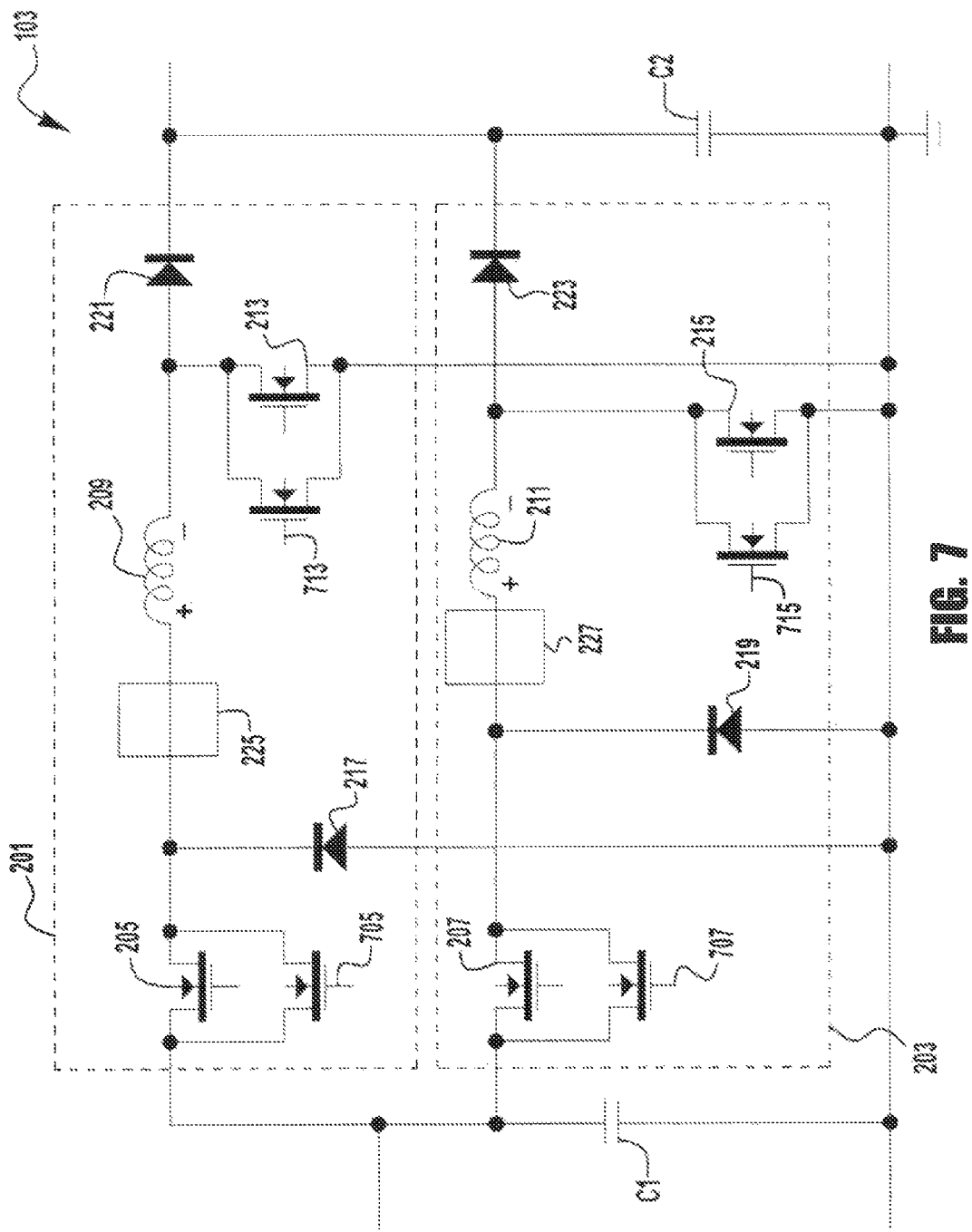

FIG. 6 is similar to FIG. 5 but depicts another exemplary embodiment of the present invention. In some exemplary embodiments of the present invention, the interleaved buck-boost circuit 103 can employ soft-switching control methodology for the buck and boost switches. One methodology to implement soft switching is to incorporate auxiliary boost and buck switches in the modules 201 and 203, which are placed in parallel to the main buck and boost switches. A simplistic example of this is shown in FIG. 7, where the auxiliary switches 705, 713, 707 and 715 are placed in parallel to the main switches 205, 213, 207 and 215, respectively. However, a more detailed discussion and depiction of soft switching technology is discussed in at least U.S. patent application Ser. No. 11/551,957 filed on Oct. 23, 2006, which is incorporated herein by reference in its entirety, that discussion will not be repeated herein. Specifically, FIG. 22 of the application Ser. No. 11/551,957 shows soft switching in a boost converter. An embodiment of an interleaved buck-boost converter using soft switching would have four of such circuits.

As shown in FIG. 6, a load dependant phase and duty cycle adjustment module 601 is incorporated which receives the signal SX from the dynamic voltage compensator module 305. The signal SX represents, at least, a load on the interleaved buck-boost circuit 103. Based on that signal SX the adjustment module 601 dynamically adjusts the phase shift and duty cycle of the main and/or auxiliary switches in the buck-boost modules 201 and 203 to optimize performance and soft-switching. Much like the main switches, each of the auxiliary switches 705, 713, 707 and 715 are connected to PWMs 605, 613, 607 and 615, respectively, and are similarly controlled as the main switches. However, based on characteristics of the load on the circuit 103 it may be necessary to dynamically adjust the phase shift and duty cycles of the auxiliary switches relative to the main switches to optimize the soft switching function and system operation. In other exemplary embodiments, the adjustment module 601 can adjust the phase shift between the buck-boost modules 201 and 203. In some exemplary embodiments, the modules 201 and 203 are operated such that they are 90 degrees out-of-phase with each other. However, in other exemplary embodiments it may be beneficial (based on load or operating conditions) to change the phase shift between the modules 201 and 203. The module 601 can be used to implement that phase shift.

As stated above, in some exemplary embodiments of the present invention the DC-DC converter stage 105 can be unregulated. In such embodiments it may be desirable to monitor the current entering the stage 105 to ensure that the current does not exceed an operational threshold. For example, as shown in FIG. 1 the controller 109 can monitor the DC-DC converter current I2 and if this current exceeds a threshold the controller 109 can shut off operation of the system 100. This aids in increasing the safety of the system 100 as the stage 105 can be an isolation stage of the system 100.

Because of the advantages of embodiments of the present invention, improved operation of the system 100 can be realized. As explained previously, without dynamic control, as described herein, prior systems represent a compromise because the compensation in the control of the system is static. Because of this, as prior systems were operated over their entire operational envelope their performance and power factor correction dropped significantly. With embodiments of the present invention, this is not the case. Specifically, embodiments of the present invention, which use single phase input power, can achieve a power factor of at least 95% in a range of 10 to 100% of the system's rated load, regardless of whether or not the input signal is single or three phase, the frequency of the input signal, the voltage of the input signal, or the loads experienced during welding or cutting. For example, if a system 100 of the present invention has a maximum load rating of 500 amps the system will achieve a power factor of at least 95% when the system 100 has an output anywhere between 50 and 500 amps. In further exemplary embodiments of the present invention, the system 100 can achieve a power factor of at least 98% in a range of 10 to 100% of the rated load of the system. Thus, embodiments of the present invention provide a highly stable system 100 over a wide range of operating conditions. In other single phase exemplary embodiments of the present invention, a power factor of at least 99% can be achieved in a range of 50 to 100% of the rated load of the system. For exemplary embodiments of the present invention utilizing three-phase input power similar benefits can be achieved. Specifically, in such three-phase embodiments the power supply can achieve a power factor of at least 93% in a range of 10 to 100% of the rated load of the system, and other exemplary embodiments can achieve a power factor of at least 95% in a range of 50 to 100% of the rated load of the system. Thus, embodiments of the present invention can provide excellent power factor over wide operational ranges. Of course, the maximum rated load of a system 100 will be a function of its design and expected utilization, but embodiments of the present invention can be utilized to create systems capable of having a maximum rated output load in the range of 5 to 1,000 amps. It is understood that systems can be made having outputs outside of this range as well.

Additional benefits of the present invention include the ability to reduce the size and capacity of storage capacitors (for example C2) because of the improved transient responsiveness of embodiments of the present invention.

Further, embodiments of the present invention can achieve the above performance attributes over a wide range of input voltages. For example, embodiments of the present invention can achieve the above stated performance attributes when the input signal is in the range of 208 to 660 Volts AC, and the signal is either single phase or three phase. That is, the above power factor performance benefits can be achieved when the input AC signal voltage is anywhere in the range of 208 to 660 VAC.

As stated above, although the majority of the discussion in the present application has been discussed within the context of welding or cutting power supplies, these discussions were exemplary. Embodiments of the present invention are not limited to such types of power supplies and can be implemented in many different types of power supplies which have a dynamic load and in which optimized performance and power factor correction are desirable. Examples of such power supplies include switch mode power supplies having similar general topologies to the topology described herein, and incorporated by reference.

While the invention has been particularly shown and described with reference to exemplary embodiments thereof, the invention is not limited to these embodiments. It will be understood by those of ordinary skill in the art that various changes in form and details may be made therein without departing from the spirit and scope of the invention as defined by the following claims.

What is claimed is:
1. A power supply, comprising:
   an input circuit which receives an input signal having a variable voltage and outputs a fixed voltage DC bus;
   an output circuit which receives said fixed voltage DC bus and provides an output signal to a load; and
   a controller which controls the operation of at least one switch in said input circuit to power factor correct said input signal,
   wherein said controller comprises a voltage compensator module which utilizes a power factor correction function having at least one power factor correction coeffi- cient used to output a power factor correction reference signal to be used for said power factor correction of said input signal; and wherein said voltage compensator module receives an input reference signal representing at least one of a voltage and a frequency of said input signal and said voltage compensator module changes said at least one power factor correction coefficient based on said input reference signal.

2. The power supply of claim 1, wherein said input signal is an AC signal and said input reference signal is received from a rectification circuit which rectifies said AC input signal.

3. The power supply of claim 2, wherein said input circuit comprises a primary input rectifier circuit and a bus voltage circuit which outputs said fixed voltage DC bus, wherein said primary input rectifier circuit rectifies said AC input signal and provides the rectified AC input signal to said bus voltage circuit, and wherein said rectification circuit receives said AC input signal upstream of said primary input rectifier.

4. The power supply of claim 3, wherein said bus voltage circuit is an interleaved buck-boost circuit.

5. The power supply of claim 1, wherein said voltage compensation module utilizes each of said voltage and frequency from said input reference signal to change said at least one power factor correction coefficient.

6. The power supply of claim 1, wherein said power supply is a welding or cutting power supply.

7. The power supply of claim 1, wherein said reference signal is passed through a frequency calculator upstream of said voltage compensation module to provide an input frequency reference signal to said voltage compensation module.

8. The power supply of claim 1, wherein said voltage compensation module receives a DC bus reference signal representative of a voltage of said fixed voltage DC bus and utilizes said DC bus reference signal to change said at least one power factor correction coefficient based on said DC bus reference signal.

9. The power supply of claim 8, wherein said DC bus reference signal is a result of a comparison of a detected voltage of said fixed voltage DC bus and a DC bus voltage setpoint.

10. The power supply of claim 9, wherein said voltage compensator module receives a DC bus transient reference signal from a transient detection module which detects a transient in the fixed voltage DC bus, and wherein said voltage compensator module changes said at least one coefficient based on said DC bus transient reference signal.

11. The power supply of claim 1, wherein said voltage compensator module receives an output load reference signal from said output signal, and wherein said voltage compensator module changes said at least one coefficient based on said output load reference signal.

12. The power supply of claim 1, wherein said output circuit comprises a converter circuit which coverts said fixed voltage DC bus to a second DC signal and wherein said second DC signal is directed to an output stage which outputs said output signal.

13. A power supply, comprising:
a first input rectification circuit which receives an AC input signal and outputs a first rectified signal;
a bus voltage circuit which receives said first rectified signal and outputs a fixed voltage DC bus, said bus voltage circuit comprising at least one switch which is used to power factor correct said first rectified signal;
an output circuit which receives said fixed voltage DC bus and provides an output signal to a load;
a controller which controls the operation of said switch in said bus voltage circuit to provide said power factor correction, wherein said controller receives a fixed voltage DC bus reference signal; and
a second input rectifier which receives said AC input signal and outputs a reference signal, wherein said reference signal is provided to said controller;
wherein said controller comprises a voltage compensator module which utilizes a power factor correction function having a plurality of power factor correction coefficients to output a power factor correction reference signal to be used for power factor correction of said first rectified signal by said bus voltage circuit; and
wherein said voltage compensator module utilizes each of said reference signal from said second input rectifier and said fixed voltage DC bus reference signal to change at least one of said plurality of coefficients.

14. The power supply of claim 13, wherein said power supply is a welding or cutting power supply.

15. The power supply of claim 13, wherein said voltage compensator module receives each of a voltage reference component of said reference signal and a frequency reference component of said reference signal and utilizes each of said voltage and frequency reference components to change said plurality of coefficients.

16. The power supply of claim 13, wherein said fixed voltage DC bus reference signal results from a comparison between a detected fixed voltage DC bus voltage level and a fixed voltage DC bus set point.

17. The power supply of claim 13, wherein said bus voltage circuit is an interleaved buck-boost circuit.

18. A welding or cutting power supply, comprising:
a first input rectification circuit which receives an AC input signal and outputs a first rectified signal;
an interleaved buck-boost circuit having a first buck-boost circuit and a second buck-boost circuit, wherein said interleaved buck-boost circuit receives said first rectified signal and outputs a fixed voltage DC bus, said interleaved buck-boost circuit comprising at least four switches which are used to power factor correct said first rectified signal;
an output circuit which receives said fixed voltage DC bus and provides an output signal to a load;
a controller which controls the operation of said at least four switches in said bus voltage circuit to provide said power factor correction, wherein said controller receives a fixed voltage DC bus reference signal;
a second input rectifier which receives said AC input signal and outputs a reference signal, wherein said reference signal is provided to said controller; and
an input current generator circuit which provides an input current reference signal to said controller which is representative of an input current to said interleaved buck-boost circuit;
wherein said controller comprises a voltage compensator module which utilizes a power factor correction function having a plurality of power factor correction coefficients to output a power factor correction reference signal to be used for power factor correction of said first rectified signal by said interleaved buck-boost circuit; and
wherein said voltage compensator module utilizes each of said reference signal from said second input rectifier and said fixed voltage DC bus reference signal to change at least one of said plurality of coefficients.

19. The power supply of claim 18, wherein said controller further comprises a current share module which receives current share reference signal which results from a comparison between a first current reference signal from said first buck-boost circuit and a second current reference signal from said second buck-boost circuit, and wherein said current share reference signal controls said at least four switches such that each of said first and second buck-boost circuits output equal current levels for said fixed voltage DC bus.

20. The power supply of claim 18, wherein said voltage compensator module receives each of a voltage reference component of said reference signal and a frequency reference component of said reference signal, and utilizes each of said voltage and frequency reference components to change said plurality of coefficients.

* * * * *